United States Patent [19]

Hertl et al.

[11] Patent Number: 5,417,947
[45] Date of Patent: May 23, 1995

[54] SYSTEM AND METHOD FOR REMOVING HYDROCARBONS FROM GASEOUS MIXTURES

[75] Inventors: William Hertl; Irwin M. Lachman, both of Corning, N.Y.

[73] Assignee: Corning Incorporated, Corning, N.Y.

[21] Appl. No.: 140,430

[22] Filed: Oct. 25, 1993

Related U.S. Application Data

[63] Continuation-in-part of Ser. No. 924,916, Aug. 5, 1992, abandoned.

[51] Int. Cl.$^6$ .................... B01D 53/04; B01D 53/34; C07C 7/12; F01N 3/00
[52] U.S. Cl. .................... 423/212; 423/213.2; 423/213.7; 585/820; 585/822; 60/297; 60/311
[58] Field of Search ............ 585/822, 820, 836; 423/213.2, 213.7, 212; 60/297, 309, 311

[56] References Cited

U.S. PATENT DOCUMENTS

| | | | |
|---|---|---|---|
| 3,067,002 | 12/1962 | Reid | 23/2 |
| 3,699,683 | 10/1972 | Tourtellette et al. | 60/274 |
| 4,631,267 | 12/1986 | Lachman et al. | 502/439 |
| 5,078,979 | 1/1992 | Dunne | 423/212 |
| 5,140,811 | 8/1992 | Minami et al. | 60/297 |

FOREIGN PATENT DOCUMENTS

| | | |
|---|---|---|
| 1132535 | 5/1989 | Japan . |
| 5-68877 | 3/1993 | Japan . |
| WO85/01986 | 5/1985 | WIPO . |

*Primary Examiner*—P. Achutamurthy
*Attorney, Agent, or Firm*—L. Rita Quatrini

[57] ABSTRACT

A method and system for removing low molecular weight olefins from gases generated during the first five minutes of start-up of an internal combustion engine. The mixture is contacted with hydrophilic material to remove at least some of the water therefrom. The hydrophilic material can be molecular sieve having pores large enough for adsorption of water molecules and small enough to prevent molecules larger than water from being adsorbed, high surface area aluminas, precursors for high surface area aluminas, high surface area silicas, and combinations thereof. The mixture is then contacted with a downstream hydrocarbon-removing agent for removing the olefins. The hydrocarbon-removing agent can be at least one molecular sieve which can be pentasil zeolites, faujasite zeolites, mordenite, beta zeolites, carbon molecular sieve, metallophosphates, aluminophosphates, silicoaluminophosphates, and combinations thereof.

12 Claims, 1 Drawing Sheet

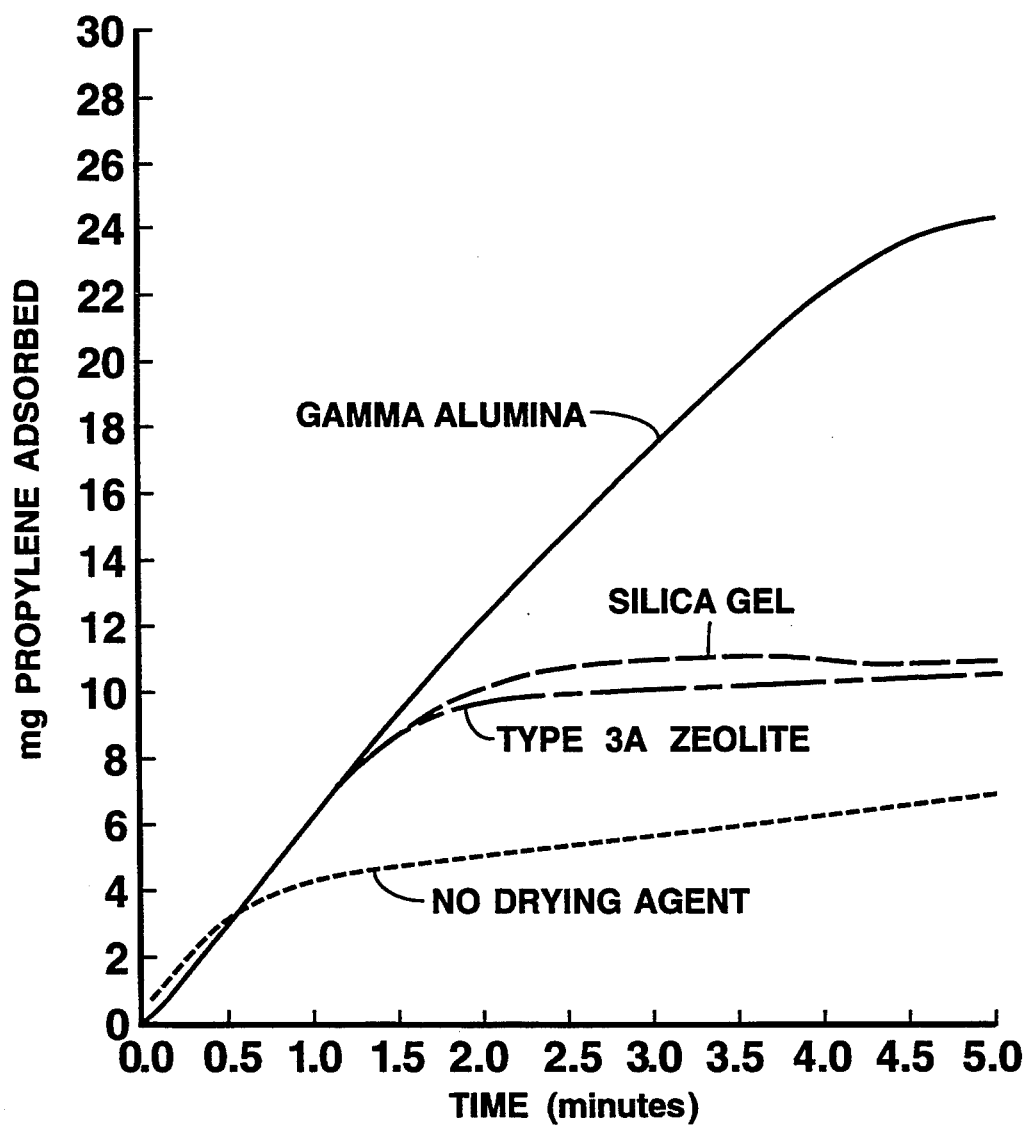

SYSTEM AND METHOD FOR REMOVING HYDROCARBONS FROM GASEOUS MIXTURES

This application is a continuation-in-part of application Ser. No. 07/924,916 filed Aug. 5, 1992, now abandoned.

This invention relates to a catalyst system and method for removing hydrocarbons from a water-containing mixture which involves contacting the mixture first with hydrophilic material to at least partially dry the mixture, and thereafter contacting the mixture with an agent for removing hydrocarbons. The system and method are especially suited for removing hydrocarbons from auto exhaust.

BACKGROUND OF THE INVENTION

Internal combustion engines emit a large amount of unburned hydrocarbons. The hydrocarbons include low molecular weight alkanes and alkenes. Of these, the low molecular weight alkenes (olefins) are very troublesome because they have a great propensity to form ozone in the atmosphere and are most difficult to trap by adsorption. Ozone is a major smog forming constituent. For this reason, emission standards are becoming more stringent with regard to ozone-forming hydrocarbons.

Internal combustion engines emit a large amount of unburned hydrocarbons during cold engine start-up. In fact, a substantial fraction of the total emitted hydrocarbons have been found to occur during the first ten seconds due to the rich fuel mixture.

Release of hydrocarbons after starting an engine poses a special problem because at this point the temperature is not high enough for conversion to innocuous products in the presence of conventional catalysts. The catalysts utilized in catalytic converter systems are generally ineffective at ambient temperature and must reach high temperatures, often in the range of 300°–400° C. before they are activated.

One method of reducing cold start emissions is to temporarily adsorb hydrocarbons on zeolites. One disadvantage of this method is that exhaust gas contains water which strongly inhibits the adsorption capacity of some zeolites, especially for olefins.

Therefore it would be desirable to have a hydrocarbon removal system in which water does not affect the adsorption of hydrocarbons.

SUMMARY OF THE INVENTION

In accordance with one aspect of the invention, there is provided a system for removing low molecular weight olefins from an exhaust gas mixture generated during the first five minutes after start-up of an internal combustion engine, which mixture contains water. The system is made up of a first stage which is hydrophilic material for removing at least some of the water from the mixture, and a second stage downstream which contains a hydrocarbon removing agent for removing low molecular weight olefins. The hydrophilic material can be molecular sieve having pores large enough for adsorption of water molecules and small enough to prevent molecules larger than water from being adsorbed, high surface area aluminas, precursors for high surface area aluminas, high surface area silicas, and combinations thereof. The hydrocarbon-removing agent can be at least one molecular sieve which can be pentasil zeolites, faujasite zeolites, mordenite, beta zeolites, carbon molecular sieve, metallophosphates, aluminophosphates, silicoaluminophosphates, and combinations thereof.

In accordance with another aspect of the invention, there is provided a method for removing hydrocarbons from a gaseous mixture which comprises water and hydrocarbons. The method involves contacting the mixture with the above described hydrophilic material to remove at least some of the water therefrom, and thereafter contacting the mixture with the above described hydrocarbon-removing agent to produce a purified mixture.

BRIEF DESCRIPTION OF THE FIGURE

FIG. 1 is a plot of quantity of adsorbed propylene versus time, for hydrocarbon-adsorbing systems in which several kinds of hydrophilic materials are used, and for a system in which no hydrophilic material is used, for comparison purposes.

DETAILED DESCRIPTION OF THE INVENTION

This invention provides a system and method of removing hydrocarbons from a water and hydrocarbon-containing mixture in which first the water is removed by hydrophilic material and thereafter the hydrocarbons are removed by a hydrocarbon-removing agent.

Especially suited to the practice of the present invention are gas mixtures which are released at start-up of internal combustion engines, especially within about 5 minutes after start up of the engine. Examples of hydrocarbons, although it is to be understood that the invention is not limited to these, are low molecular weight or light hydrocarbons found in gasoline, diesel fuel, alcohols, and their products of combustion and molecular rearrangements. Alkanes and alkenes with 1 to 6 carbon atoms are considered to be low molecular weight hydrocarbons. The invention is especially suited for low molecular weight alkenes (olefins). Some examples are ethylene, propylene, butadiene, pentene, and other unsaturated hydrocarbons. The invention is especially suited for removal of hydrocarbons having a Maximum Incremental Reactivity (MIR) of greater than about 1.0. The MIR is a measure of the propensity of a given hydrocarbon to form ozone expressed as grams ozone/gram of organic gas. The MIR is used in calculating the potential amount of ozone formed per mile for a specific hydrocarbon. In general, alkanes or paraffins have low MIR values ($<0.5$), aromatic compounds vary from $<1$ to about 10, and light alkenes or olefins especially ethylene, propylene and butadiene have very high MIR values of about 7.2 to about 10.8. Description of MIR values and a list of the MIR values assigned to various hydrocarbons is given in Technical Support Document entitled "Proposed Reactivity Adjustment Factors for Transitional Low-Emission Vehicles", Sep. 27, 1991, Mobile Source Division, Research Division, California Air Resources Board, Part B, and Appendix A-1.

The exhaust gas mixture contains typically about 2500 to 10000 volume ppm of hydrocarbons during the initial start-up period which is typically less than about 5 minutes, but this can vary.

The hydrophilic material is one that preferentially takes up or adsorbs water from gas streams containing hydrocarbons and therefore functions as a drying agent. The hydrophilic material can be one or more of the following: molecular sieve, high surface area aluminas, precursors for high surface area aluminas, or high surface area silicas.

Molecular sieves have pores defined by their crystalline structure. The pores of the hydrophilic molecular sieves must be large enough for the adsorption of water molecules and preferably small enough to prevent larger molecules from being adsorbed. It is preferred that the pore size of these molecular sieves be greater than about 2 angstroms in diameter, and preferably about 2 to about 5 angstroms in diameter, and most preferably about 2.5 to about 4.0 angstroms in diameter.

Some hydrophilic materials that are especially suited for use as drying agents for hydrocarbon-containing gaseous mixtures are Types A, L, and X zeolites, chabazite, erionite, clinoptilolite, ferrierite, phillipsite, mazzite, offretite, aluminophosphates, and silicoaluminophosphates, and combinations of these. These types are meant also to include various ion-exchanged forms of these zeolites. Most preferred of these types of molecular sieves are KaA (Type 3A), NaA (4A), CaA (Type 5A), LiA, NaX (13X), K-erionite, phillipsite, and combinations of these. The preferred high surface area alumina is gamma alumina. Precursors for high surface area aluminas are those which form high surface area transition aluminas when they are fired. The preferred alumina precursors are alumina hydrates, such as gibbsite, bayerite, nordstrandite, boehmite, and diaspore. It is preferred that the surface area of the aluminas be at least about 50 $m^2/g$, and preferably greater than about 200 $m^2/g$.

It is preferred that the high surface area silicas have a surface area of at least about 50 $m^2/g$, preferably at least about 200 $m^2/g$, and most preferably at least about 300 $m^2/g$. The preferred high surface area silica is silica gel.

The hydrocarbon removing agent can be any material which removes hydrocarbons from gas streams, such as by catalytic conversion, eg, cracking or oxidation, or sorption. Sorbing material or sorbing agents take up and hold substances by either absorption or adsorption. These constituents can then desorb under certain conditions which are predetermined. The term "sorbing material" or "sorbing agent" as used in the present invention can mean one or a plurality of sorbing agents. Adsorption is the taking up and holding of molecules by physical or chemical forces, termed respectively, physical or chemical adsorption. The term "adsorbing agent" according to the present invention means at least one adsorbing agent. There can be more than one type of adsorbing agent making up the hydrocarbon removing agent.

Some typical adsorbing agents that are suited for removal of hydrocarbons are those that adsorb at relatively low temperatures and desorb at relatively high temperatures. For example, adsorbing agents that adsorb hydrocarbons at engine start-up temperatures which are typically less than about 150° C., and desorb at engine exhaust temperatures which are typically greater than about 150° C. are especially suited to the practice of the present invention.

Some typical hydrocarbon adsorbing agents which are especially suited to the practice of the present invention are molecular sieves, activated carbon, and combinations of these.

Molecular sieves are crystalline substances having pores of size suitable for adsorbing molecules.

Some types of hydrocarbon-adsorbing molecular sieves which are preferred for the practice of the present invention are carbon molecular sieves, zeolites, metallophosphates, aluminophosphates, silicoaluminophosphates, and combinations of these.

Carbon molecular sieves have well defined micropores made out of carbon material.

Some preferred zeolites are faujasite type, especially preferred of which is ultra stable Y, (USY) preferably with $SiO_2/Al_2O_3$ mole ratios of greater than about 5, pentasil type, preferred of which are ZSM type such as ZSM-5, most preferred of which have $SiO_2/Al_2O_3$ mole ratios of greater than about 25, and mordenite, and beta zeolite, and combinations of these.

Depending on the silica/alumina ratio, zeolites can have mainly physical adsorption or a combination of physical and chemical adsorption. In physical adsorption, the adsorbents weakly hold the adsorbed species within or on their structure. Species that are physically adsorbed, desorb at relatively low temperatures, eg., room temperature. In chemical adsorption, the adsorbents strongly hold the adsorbed species within their structure. Species that are chemically adsorbed, desorb at relatively high temperatures ie, typically above room temperature. (Low and high temperatures are strictly relative terms). As is known in the art, a zeolite can function also as a cracking catalyst or an oxidation catalyst. For oxidation, the zeolite can have a catalyst metal exchanged therein. A zeolite can be used as formed or ammoniated, but is preferably in the $H^+$ form, or ion exchanged with an alkali or alkaline earth metal, but preferably with a transition metal e.g., of atomic number 21 thru 79, as a noble metal, e.g., Pt or Pd, etc., as is known in the art depending on the adsorption or conversions which are desired.

Some drying agent-adsorbing agent combinations that are suited to the practice of the present invention are as follows:

| Drying Agent | Adsorbing Agent |
| --- | --- |
| KA or NaA or K-Erionite | ZSM-5 |
| Gamma alumina | ZSM-5 |
| Silica gel | ZSM-5 |
| KA or Clinoptilolite or gamma alumina | USY |
| 13X or Phillipsite or silica gel | Beta |
| Chabazite or NaA | USY + mordenite |
| KA or Phillipsite | ZSM-5 + USY + mordenite |
| NaA or Chabazite | Beta + USY |

The drying agent and hydrocarbon removing agents can be used in any form. For example they can be typically in contact with substrates. The substrates can be of any size and shape suitable to the application, for example, pellets, beads, monoliths, etc. The substrates are most typically monolith substrates. The monoliths are typically bodies having inlet and outlet ends and a multiplicity of open ended cells extending from inlet to outlet end with porous walls between and separating adjacent cells from one another. The monoliths are preferably honeycomb structures.

The drying agent and hydrocarbon-removing agent can be applied to the substrate by conventional washcoating or spraying techniques. For example, the substrate is contacted with a slurry containing the agent and other components such as binders, and dispersing agents, etc, as is known in the art. Some binders are aluminum oxide, most preferred of which is the precursor boehmite, other precursors of aluminum oxide, e.g., aluminum nitrate, and silica, titania, zirconia, rare earth oxides, e.g., ceria, etc, and their precursors.

Some typical compositions that can be used for drying agents and hydrocarbon-removing agents are in percent by weight 0 to about 50 methylcellulose, 0 to about 50 silica, 0 to about 50 $Al_2O_3$ from boehmite, aluminum nitrate, or alumina sol as binders, and about 50 to about 95 of the agent. More preferred compositions are in percent by weight 0 to about 5 methylcellulose, 0 to about 10 silica, 0 to about 15 alumina from aluminum nitrate, 0 to about 15 alumina from boehmite, and about 70 to about 90 being the agent.

Unavoidable impurities can also be present in the compositions of the present invention, if they do not interact with the constituents of these compositions. However, impurities that cause sintering or destruction of the zeolite structure must be kept at low levels. Most typically, impurities should be kept below about 5 wt. %, preferably below about 1% and most preferably below about 0.01%.

Some especially preferred compositions for the drying agent are given in Table 1, and for the hydrocarbon-removing agent, in Table 2. In each case, the constituents or their precursors are blended with about 0.5 to about 2.0% methylcellulose (Dow A4M). In each case a slurry is formed in a suitable machine such as a ball mill, mix-muller, or double-arm mixer by admixing with a liquid medium optionally containing about 0.01 to about 1.0% by weight surface active agent such as Airco's Surfanol 485. The preferred liquid medium is water, however organic liquids in combination with water can also be used, for example, isopropyl alcohol+water. Organic liquids by themselves can also be used, e.g., toluene or xylene.

TABLE 1

Weight Percent Constituents Of Drying Agent Compositions After Final Heat Treatment

| Dryer Constituent | A | B | C | D | E |
|---|---|---|---|---|---|
| NaA zeolite | — | — | — | — | — |
| KA zeolite | 85 | 85 | — | — | — |
| Type X zeolite | — | — | 85 | — | — |
| Gamma alumina | — | — | — | 85 | — |
| Silica gel | — | — | — | — | 85 |
| Gamma alumina [from Dispersal Boehmite, Condea Chemie] | — | 5 | 12 | 15 | — |
| Gamma alumina [from Nyacol Al colloidal alumina sol] | 15 | 10 | — | — | — |
| Gamma alumina [from Reagent Aluminum Nitrate] | — | — | 3 | — | — |
| Silica [from DUPONT Ludox HS-40] | — | — | — | — | 15 |

| Dryer Constituent | F | G | H | I | J |
|---|---|---|---|---|---|
| NaA zeolite | 45 | — | — | 80 | — |
| KA zeolite | — | 45 | — | — | — |
| Type X zeolite | — | — | 45 | — | — |
| Gamma alumina | 45 | — | — | — | — |
| Silica gel | — | 45 | 45 | — | 90 |
| Gamma alumina [from Dispersal Boehmite, Condea Chemie] | — | — | — | 17 | 10 |
| Gamma alumina [from Nyacol Al colloidal alumina sol] | 10 | — | 10 | — | — |
| Gamma alumina [from Reagent Aluminum Nitrate] | — | — | — | 3 | — |
| Silica [from DUPONT Ludox HS-40] | — | 10 | — | — | — |

TABLE 2

Weight Percent Constituents of Adsorber Compositions After Final Heat Treatment

| Constituent | A | B | C | D | E | F |
|---|---|---|---|---|---|---|
| ZSM-5 [$SiO_2/Al_2O_3$ = 26/1] | — | 45 | — | — | — | 30 |
| ZSM-5 [$SiO_2/Al_2O_3$ = 150/1] | — | — | 45 | — | — | — |
| ZSM-5 [$SiO_2/Al_2O_3$ = 55/1] | 28.3 | — | — | — | — | — |
| ZSM-5 [$SiO_2/Al_2O_3$ = 280/1] | — | — | — | 45 | 30 | — |
| Beta Zeolite [$SiO_2/Al_2O_3$ = 20/1] | — | — | — | — | — | — |
| Ultra Stable Y [$SiO_2/Al_2O_3$ = 12.5/1] | 28.3 | 40 | — | — | 30 | — |
| Ultra Stable Y [$SiO_2/Al_2O_3$ = 200/1] | — | — | 40 | — | — | 30 |
| Mordenite [$SiO_2/Al_2O_3$ = 20/1] | 28.4 | — | — | 45 | 30 | 30 |
| Gamma alumina [from Dispersal Boehmite, Condea Chemie] | — | 15 | 12 | 10 | — | 7 |
| Alumina [from Nyacol AL colloidal alumina sol] | 15 | — | — | — | — | — |
| Gamma Alumina [from Reagent Aluminum nitrate] | — | — | 3 | — | — | 3 |
| Silica from [DUPONT Ludox S-40] | — | — | — | — | 10 | — |

| Constituent | G | H | I | J | K | L |
|---|---|---|---|---|---|---|
| ZSM-5 [$SiO_2/Al_2O_3$ = 26/1] | — | — | — | 85 | — | — |
| ZSM-5 [$SiO_2/Al_2O_3$ = 150/1] | — | — | — | — | — | — |
| ZSM-5 [$SiO_2/Al_2O_3$ = 55/1] | — | — | — | — | — | — |
| ZSM-5 [$SiO_2/Al_2O_3$ = 280/1] | — | — | 30 | — | — | — |
| Beta Zeolite [$SiO_2/Al_2O_3$ = 20/1] | — | 30 | — | — | 85 | — |
| Ultra Stable Y [$SiO_2/Al_2O_3$ = 12.5/1] | 89 | 30 | 30 | — | — | 85 |
| Ultra Stable Y [$SiO_2/Al_2O_3$ = 200/1] | — | — | — | — | — | — |
| Mordenite [$SiO_2/Al_2O_3$ = 20/1] | — | 30 | 30 | — | — | — |
| Gamma alumina [from Dispersal Boehmite, Condea Chemie] | — | — | — | — | 15 | 15 |
| Alumina [from Nyacol AL colloidal alumina sol] | — | 10 | — | 15 | — | — |
| Gamma alumina from Reagent Aluminum nitrate | — | — | — | — | — | — |
| Silica [from DUPONT Ludox HS-40] | 11 | — | 10 | — | — | — |

These compositions in slurry form are used to coat monolith substrates. For example, the substrate is dipped into the slurry, repeatedly if necessary until the desired amount of the composition is coated on the substrate. Excess slurry is removed and the coated substrate is dried and fired.

The substrates are made of material that is suitable preferably for high temperature applications. Some preferred materials are those that include as a predominant phase: ceramic, glass-ceramic, glass, high surface area-high temperature stable oxides, metals, and combinations thereof. By combinations is meant physical or chemical combinations, eg., mixtures, compounds, or composites. Some materials that are especially suited to the practice of the present invention, although it is to be understood that the invention is not limited to these, are those made of cordierite, mullite, clay, talc, zircon, zirconia, spinel, alumina, silica, borides, lithium aluminosilicates, alumina silica, feldspar, titania, fused silica, nitrides, borides, carbides, eg., silicon carbide, silicon nitride or mixtures of these. Some typical ceramic substrates are disclosed in U.S. Pat. Nos. 4,127,691 and 3,885,977. Those patents are herein incorporated by reference as filed. Other types of bodies are metal bodies. Some preferred types of metal bodies, although it is to be understood that the invention is not limited to such, are bodies made of iron group metals such as, for example, Fe-Al or Fe-Cr-Al with optional additions for enhancement of various properties. For example, additions of oxides are included for enhancement of properties such as heat, corrosion, oxidation resistance, etc. Some metal bodies which are especially suited to the practice of the present invention are discussed in U.S. Pat. Nos. 4,758,272 and 4,992,233 and in U.S. application Ser. No. 07/767,889, (European patent application publication no. 488716), filed Sep. 30, 1991. These patents and application are herein incorporated by reference as filed.

Some examples of honeycombs produced by the process of the present invention, although it is to be understood that the invention is not limited to these, are those having about 94 cells/cm$^2$ (about 600 cells/in$^2$), about 62 cells/cm$^2$ (about 400 cells/in$^2$), or about 47 cells/cm$^2$ (about 300 cells/in$^2$), those having about 31 cells/cm$^2$ (about 200 cells/in$^2$), or about 15 cells/cm$^2$ (about 100 cells/in$^2$), or about 2.5 cells/cm$^2$, (about 16 cells/in$^2$) or about 1.5 cells/cm$^2$ (about 9 cells/in$^2$). These bodies are made preferably of, but not limited to materials which when fired form cordierite. Typical wall thicknesses in catalytic converter applications, for example, are about 0.15 mm (about 6 mils) for 62 cells/cm$^2$ (400 cells/in$^2$) honeycombs. Wall thicknesses range typically from about 0.1 to about 0.6 mm (from about 4 to about 25 mils). The external size and shape of the body is controlled by the application, e.g., engine size and space available for mounting.

The substrate body can have any degree of wall porosity from essentially none, or low to high. For example, typically the wall porosity ranges from 0% by volume to higher values which are determined by practical limits depending on the composition of the substrate and the intended application, e.g., the nature of the material which is to be coated on the walls, etc. The porosity is typically about 30% to about 70% by volume. The invention is especially suited for low-to-moderate porosity bodies, that is, those having total porosities of about 30% to about 50% by volume.

In general, the average pore size is about 2 to about 70 and preferably about 3 to about 50 microns in diameter for most applications.

The compositions of Tables 1 and 2 can be formed into bodies such as extruded monoliths by methods known in the art, for example, silica gel drying agent, alumina drying agent, and mordenite hydrocarbon-removing agent. Some methods are discussed in U.S. Pat. No. 4,631,267 which is herein incorporated by reference as filed.

Silica gel can be formed in situ by reaction of sulfuric acid with sodium silicate, etc. or the already formed silica gel powder can be extruded. This is done typically by mixing raw material powders, inorganic and organic additives and binders, plasticizing with water, forming into a body such as by extruding, e.g., a honeycomb, drying and firing at about 400° C. to about 800° C. A most preferred technique is given in the examples that follow.

The alumina monolith can be formed from a plasticizable mixture of an alumina precursor such as boehmite.

The hydrophilic material is located upstream from the hydrocarbon removing agent.

The drying agent and the hydrocarbon removing agent can share one substrate unit in which case the hydrophilic material is on the inlet end of the substrate and the hydrocarbon removing agent is on the outlet end. Or they can be on separate units or they themselves can form separate units, or there can be any combination of these. Additionally, hydrophilic material can be located downstream of the hydrocarbon adsorbing agent. This prevents moisture from back diffusing through the exhaust system and reaching the hydrocarbon adsorbing agent especially after the engine has been shut down.

In auto exhaust conversion applications, the drying agent and hydrocarbon removing agent can be used in any conventional form. The agents are typically on substrates which are placed one after the other so the exhaust gas flows from inlet to outlet ends sequentially from one to the other.

Although it is not necessary, by-pass valving can be used as is known in the art to direct exhaust gas flow to the drying agent and hydrocarbon-removing agent system, and to the main body catalyst. After adsorption, the system is by-passed and after normal engine operating conditions are attained and the main catalyst is functioning, the system can be desorbed. The system can then be by-passed until the next start-up period. The desorption cycle is that in which the adsorbed water desorbs and passes out of the system, and the adsorbed hydrocarbons desorb and are either recirculated to the engine, or converted by the main body catalyst and exit the system as $CO_2$ and water.

The main body catalyst, that is, the catalyst for converting $NO_x$, CO, and hydrocarbons to innocuous products can be any conventional catalyst known in the art. By innocuous products is meant those that are generally considered to be harmless to health and the environment, such as $CO_2$, $N_2$, $H_2$, and water. Some preferred main body catalysts are for example, noble metal as eg, Pt, Pd, Rh, or combinations thereof on alumina, ceria, lanthana, zirconia, yttria, or combinations thereof. It is especially preferred to use a three-way catalyst. Some typical three-way catalysts which are especially suited to the practice of the present invention for auto exhaust conversion are Pt on ceria-alumina combined with Rh on zirconia. The Pt-ceria-alumina and the Rh-zirconia can be combined and applied at once, as in a single coating or they can be applied in separate coatings. Another suitable catalyst is Pt/Pd/Rh on gamma alumina with a rare earth oxide such as ceria.

In auto exhaust conversion applications, the substrates (or agents which are in the form of monolith structures) are held fixed in conventional canisters by conventional means such as, for example, by metal mesh, or ceramic mats, etc. Refractory fibrous material is often used to prevent passage of gases between the stages and the canister.

To more fully illustrate the invention, the following non-limiting examples are presented. All parts, portions, and percentages are on a weight basis unless otherwise stated.

Preparation of Adsorbing Agents and Drying Agents Which Are Used in the Following Examples Preparation of Hydrocarbon Adsorber Weighed quantities of ZSM-5 zeolite (silica/alumina=26:1) and colloidal gamma alumina binder are mixed into deionized water and then roll milled for about 2 hours to obtain a uniform dispersion containing about 85% zeolite and 15% gamma alumina on a dry weight basis. About 0.5% Surfanol 485 by Airco is used to assist dispersion and to function as a wetting agent. A cordierite honeycomb substrate (5.15 g, about 400 cells/in$^2$, or about 47 cells/cm$^2$, 1" (2.54 cm) diameter, 1" (2.54 cm) length) is then dipped into the dispersion for about 1 minute, removed, and the channels blown out with a stream of air to remove excess liquid. The coated substrate is then dried at about 150° C. in a circulating air oven and weighed. If insufficient coated solids are present, the dipping and drying procedure is repeated until the desired weight of coating is obtained. The substrate with the coating is then fired at about 500° C. for about 3 hours, and weighed. This sample weighs about 7.34 g (about 5.06 g cordierite, about 1.94 g zeolite+0.34 g alumina binder).

Preparation of Alumina Drying Agent Honeycombs

Composition:
About 90 parts Vista Catapal boehmite, 12.2 micron average particle size,
about 5 parts Cabosil EH-5 silica,
about 6 parts Dow Chemical methylcellulose grade K75
about 50 parts of Remet Dispural slurry of about 89% distilled water, about 10% Dispural Boehmite, about 1% acetic acid, adjusted to Ph about 3.3 with ammonia, and aged overnight and Ph adjusted to about 7.0,
about 20 parts distilled water.

Fabrication of honeycombs:
The above first three constituents are dry mixed in a laboratory Brabender intensive mixer. They are then combined with the last two constituents in a laboratory mix-muller and thoroughly plasticized. One inch (about 2.54 cm) diameter honeycombs are extruded of about 400 cells/in$^2$, or about 47 cells/cm$^2$, about 0.006" (about 0.15 mm) wall thickness. These are dried at about 100° C. and then fired at about 500° C. for about 6 hours. The honeycombs each contain about 3.7 g of gamma alumina.

Preparation of Type KA Zeolite Drying Agent

Composition A of Table 1 is prepared by mixing KA zeolite powder and colloidal gamma alumina binder in deionized water. This mixture is then roll milled for about 2 hours to obtain a uniform dispersion containing about 85% zeolite and about 15% gamma alumina binder on a dry weight basis. About 0.5% Surfanol 485 by Airco is used to assist dispersion and as a wetting agent. The weighed cordierite honeycomb substrate (5.26 g about 400 cells/in$^2$, or about 47 cells/cm$^2$, 1" (2.54 cm) diameter, 1" (2.54 cm) length) is then dipped into the dispersion for about 1 minute, removed, and the channels blown out with a stream of air to remove excess liquid. The coated substrate is then dried at about 100° C. in a circulating air oven and weighed. If insufficient coated solids are present, the dipping and drying procedures are repeated until the desired weight of coating is obtained. The substrate with the coating is then fired at about 500° C. for about 3 hours and weighs about 7.3 g total (1.73 g type KA zeolite, 0.31 g binder.)

Preparation of Silica Gel Drying Agent

The following mixture is made up: 18 parts silica gel supplied by WR Grace, grade 81, reduced to a powder of about 10 microns average particle size, 65 parts CE Minerals fused quartz grade 44I, (−325 mesh), 17 parts Dow Corning silicone resin Q6-2230 and 6 parts methylcellulose [F-60 DOW Methocel] (all parts are on a dry basis). To this mixture is added about 36% of a liquid containing a 50:50 volume mixture of water+isopropyl alcohol. The liquid and solid mixture is plasticized in a mix-muller, and then extruded using conventional means, into a honeycomb monolith having about 400 cells/in$^2$, or about 47 cells/cm$^2$. It is dried at about 100° C., and fired at about 500° C. for about 6 hours. The 1" (2.54 cm) diameter×1" (2.54 cm) length honeycomb contains about 1.5 g of silica gel drying agent.

The hydrocarbon-containing gas stream used in the following examples has the following composition on a volume basis: $NO_x$=1000 ppm, CO=1%, $H_2$=0.33%, $O_2$=0.77%, $CO_2$=14%, propylene=500 ppm, 2.5% water, balance $N_2$.

EXAMPLE 1 (ILLUSTRATIVE)

To experimentally show the working of this invention, the following test was done. The honeycomb that was coated with the Type KA zeolite drying agent (Composition A of Table 1) was placed in the upstream position in a test furnace and the honeycomb with the ZSM-5 zeolite hydrocarbon adsorber (Composition J of Table 2) was placed in the downstream position. The samples were exposed to the hydrocarbon containing gas stream at a space velocity=50,000 volume changes/hour. The temperature was raised from ambient to 600° C. and then cooled back to room temperature. The concentration of hydrocarbon in the exhaust gas entering the furnace was continuously controlled by a mass flow controller and the concentration of hydrocarbons leaving the furnace was continuously monitored with a detector. The difference between these two values along with the known flow rate was used to calculate the amount of hydrocarbon adsorbed. FIG. 1 is a plot of the mg of propylene adsorbed at ambient temperature as a function of time for the initial five minutes of exposure to the gas stream, since this data would correspond to automotive cold-start during the initial several minutes.

The experiment was then repeated with about 2.5 vol % water added to the synthetic exhaust gas mixture and with the temperature maintained at about ambient.

When a given set of drying and adsorbing agents are reused in another drying-adsorption cycle, or prior to first use, they are first heated to a temperature of about 600° C. to remove water and adsorbed hydrocarbons, and then cooled.

EXAMPLE 2 (ILLUSTRATIVE)

The procedure of Example 1 is repeated except that the drying agent is the extruded silica gel (instead of the 3A zeolite), which is placed upstream of the ZSM-5 zeolite adsorber.

EXAMPLE 3 (ILLUSTRATIVE)

The procedure of Example 1 is repeated except that the drying agent is the gamma alumina honeycomb (instead of the KA (3A) zeolite), which is placed upstream of the ZSM-5 zeolite adsorber. Example 4 (Comparative Control)

The procedure of Example 1 is run except that there is no upstream drying agent present.

In FIG. 1, the lower curve shows the adsorption of propylene on the ZSM-5 zeolite (Example 4, comparison control run) when no drying agent is present. Only about 4–5 mg of propylene are adsorbed during the initial 5 minutes. With the type 3A zeolite, silica gel, and gamma alumina drying agents, it is seen that a substantially larger amount of propylene adsorption occurs during the first several minutes than when no drying agent is used. These data show that the drying agent in the system eliminates the poisoning effect of water during the first few minutes of exposure to the wet exhaust gases.

It should be understood that while the present invention has been described in detail with respect to certain illustrative and specific embodiments thereof, it should not be considered limited to such but may be used in other ways without departing from the spirit of the invention and the scope of the appended claims.

What is claimed is:

1. A method for removing low molecular weight olefins from a gaseous mixture generated at start-up of an internal combustion engine, which mixture contains water, the method comprising:
   a) providing hydrophilic material for removing water upstream of an agent for removing said olefins with respect to the path of the gaseous mixture;
   (b) contacting the mixture first with the upstream hydrophilic material to remove at least some of the water therefrom,
   wherein the hydrophilic material is selected from the group consisting of hydrophilic molecular sieves, high surface area aluminas, precursors for high surface area aluminas, high surface area silicas, and combinations thereof, wherein the hydrophilic molecular sieves are selected from the group consisting of A zeolite, L zeotite, X zeolite, chabazite, erionite, clinoptitolite, ferrierite, phillipsite, mazzite, offretire, and combinations thereof, and have a pore size of about 2 to 5 angstroms in diameter; and thereafter
   c) contacting the mixture with the downstream olefin-removing agent to remove said olefins from said mixture and produce a mixture purified thereof,
   wherein the olefin-removing agent is selected from the group consisting of pentasil zeolites, faujasite zeolites, mordenite, beta zeolites, carbon molecular sieve, metallophosphates, aluminophosphates, silicoaluminophosphates, and combinations thereof,
   said contactings being done within about 5 minutes after start up of said internal combustion engine.

2. A method of claim 1 wherein the Maximum Incremental Reactivity of said olefins is about 7.2 to about 10.8.

3. A method of claim 1 wherein said molecular sieve is selected from the group consisting of NaA zeolite, CaA zeolite, KA zeolite, LiA zeolite, NaX zeolite, K-erionite, phillipsite, and combinations thereof.

4. A method of claim 3 wherein said molecular sieve is KA zeolite.

5. A method of claim 1 wherein the surface area of said aluminas and said silicas is at least about 50 $m^2/g$.

6. A method of claim 5 wherein said surface area is at least about 200 $m^2/g$.

7. A method of claim 6 wherein the surface area of said silicas is at least about 300 $m^2/g$.

8. A method of claim 5 wherein the hydrophilic material is silica gel.

9. A method of claim 5 wherein the hydrophilic material is gamma alumina.

10. A method of claim 1 wherein the hydrocarbon-removing agent is selected from the group consisting of pentasil zeolites, faujasite zeolites, mordenite, beta zeolites, and combinations thereof.

11. A method of claim 1 wherein the hydrocarbon-removing agent is selected from the group consisting of ultra stable Y zeolite, ZSM zeolite, and combinations thereof.

12. A method of claim 11 wherein the zeolite is ZSM-5.

* * * * *

UNITED STATES PATENT AND TRADEMARK OFFICE
CERTIFICATE OF CORRECTION

PATENT NO. : 5,417,947
DATED : May 23, 1995
INVENTOR(S) : William Hertl and Irwin M. Lachman It is certified that error appears in the above-indentified patent and that said Letters Patent is hereby corrected as shown below:

Col. 11, line 19, "clinoptitolite"
should be "clinoptilolite"

Col. 11, line 20, "offretire"
should be "offretite"

Signed and Sealed this

Third Day of October, 1995

Attest:

BRUCE LEHMAN

Attesting Officer    Commissioner of Patents and Trademarks